Patented Apr. 17, 1951

2,549,651

UNITED STATES PATENT OFFICE 2,549,651

PYRIDINE PREPARATION

Cyrus A. Weisgerber, Wilmington, Del., assignor to Hercules Powder Company, Wilmington, Del., a corporation of Delaware No Drawing. Application August 19, 1948, Serial No. 45,218

6 Claims. (Cl. 260—290)

This invention relates to a new process of synthesizing pyridines and more particularly to the preparation of pyridine or a substituted pyridine by the action of a nitrile on a conjugated diolefin.

Many methods have been suggested for the synthesis of pyridine compounds. However, the methods are, as a whole, complex, depend upon expensive starting materials and yield complex pyridines. Consequently such methods are not applicable to the large scale production of simple pyridine derivatives. One method which has received considerable attention is the reaction of acetylene and ammonia at high temperatures. This reaction yields as a product a complex mixture of alkyl pyridines and if one specific compound is desired it cannot be prepared in this way. Another reaction which has been extensively studied is that of paraldehyde and ammonia to give 2-methyl-5-ethylpyridine. While this reaction does give good yields of this particular alkylpyridine, it is a synthesis of only the one pyridine and is an expensive reaction due to the cost of the paraldehyde and the large amount of water formed as a by-product.

Now in accordance with this invention, it has been found that either pyridine or a substituted pyridine may be prepared by reacting a conjugated diolefin with a nitrile in the presence of an aluminum oxide catalyst. This process is advantageous over the prior art processes in that it employs readily available and cheap reactants, which are easily separated from the products for recycling in the process, and in general yields as a maximum no more than two isomers which isomers are position isomers. Thus it provides a method for economically producing any desired pyridine.

The following examples illustrate the new process of preparing pyridines in accordance with this invention. All parts and percentages are by weight unless otherwise indicated.

Example 1

The apparatus used in this and the following examples was a vertical reactor tube equipped at the top with a gas inlet tube and an inlet tube from a liquid reservoir. The bottom of the reactor was fitted with a vertical condenser to which was attached a receiver. An outlet tube on the receiver led through a cooling coil to condense the unused gaseous diolefin or returned the diolefin for recycling through the reactor. The reactor tube was externally heated, the temperature being measured by means of thermocouples placed within the reaction zone.

The reactor tube was packed with 4–8 mesh alumina which had previously been saturated with a 5% solution of stannous chloride dissolved in aqueous hydrochloric acid. The catalyst was then dried at 395° C. under a stream of nitrogen for 18 hours. Butadiene was passed into the reactor from the gas inlet tube and acetonitrile from the liquid reservoir. The two reactants were passed over the catalyst at a temperature which ranged from 458° C. at the beginning to 498° C. at the end. The reaction was stopped at the end of 3 hours and the material in the receiver was fractionated at atmospheric pressure and the material which distilled at a head temperature of 125°–130° C. was collected. The product was identified as 2-picoline by preparing its picrate which was found to melt at 160°–161° C.

Example 2

Example 1 was repeated except that the catalyst used was an untreated alumina catalyst and benzonitrile was substituted for the acetonitrile used in that experiment. The temperature range in the reaction zone was 391° C. to 424° C. After 4 hours the flow of reactants was stopped and the liquid product in the receiver was fractionated. The fraction which distilled at a head temperature of 105° C. at 1 mm. pressure had a refractive index of $n_D^{25}$ 1.5852 and was identified as 2-phenylpyridine by forming its picrate which melted at 165°–167.5° C.

Example 3

The reactor described in Example 1 was packed with alumina and after heating the catalyst in a stream of nitrogen, isoprene was introduced into the reactor along with a stream of hydrogen cyanide. The temperature range in the reaction zone was 518° C. at the beginning to 546° C. at the end. After 3 hours the flow of reactants was stopped and the product in the receiver was fractionated at atmospheric pressure. The fraction distilling at a head temperature of 160° C. was collected. This material had a refractive index of $n_D^{25}$ 1.4653 and was found to be a mixture of 3- and 4-picolines. The presence of these 2 isomers was identified by the fractional crystallization of their picrates. The 2 isomers, 3- and 4-picoline, boil at 144°–145° C. and their picrates melted at 149°–150° C. and 167° C. respectively.

Example 4

The same apparatus as described in Example 1 was used but in this case, the two reactants being liquid were mixed and then dropped onto the heated catalyst. The reactor was packed with alumina, which was then dried by heating at 400° C. in a stream of nitrogen. A solution of acetonitrile and 2,3-dimethyl-butadiene, in a 2:1 molar ratio, was dropped into the tube during 6 hours at a temperature of 420° to 460° C. The reaction product was fractionated under reduced pressure. The fraction distilling at a head temperature of 60°–65° C. at 2 mm. pressure was 2,4,5-trimethyl-pyridine. It was identified by the formation of its picrate which melted at 158°–158.5° C.

Pyridine or a substituted pyridine may be synthesized in accordance with this invention by reacting a conjugated diolefin with a nitrile in the presence of an aluminum oxide catalyst. The pyridine which is produced will depend upon the diolefin and the nitrile used as the starting material. For example, pyridine itself may be prepared by reacting butadiene with hydrogen cyanide, a 2-methyl-substituted pyridine may be prepared by reacting butadiene with acetonitrile and 3- and 4-methyl-substituted pyridines by reacting isoprene with hydrogen cyanide, etc. The reaction in accordance with this invention may be represented as follows:

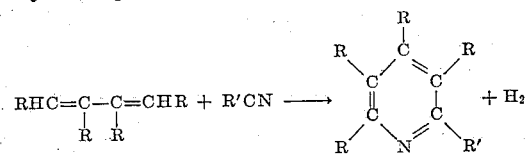

were R may be hydrogen, alkyl, cycloalkyl, aryl, alkaryl, or halogen, and R' may be hydrogen, alkyl, cycloalkyl, aryl, or alkaryl.

Among the conjugated diolefins which may be mentioned as operable in the reaction in accordance with this invention are butadiene, isoprene, 2,3-dimethyl butadiene, chloroprene, 2-methyl-1,3-pentadiene, 2-phenyl-butadiene, etc.

The nitrile which is reacted with the conjugated diolefin in accordance with this invention may be hydrogen cyanide or any organic nitrile as, for example, acetonitrile, propionitrile, butyronitrile, isobutyronitrile, benzonitrile, phenylacetonitrile, etc.

Thus, by carrying out the reaction in accordance with this invention it is possible to synthesize pyridine, the picolines, or any other substituted pyridine containing as a substituent one or more alkyl, cycloalkyl, aryl, or alkaryl radicals or halogen.

The reaction between the diolefin and the nitrile is carried out in the vapor phase in the presence of an aluminum oxide catalyst. Any method of bringing the reactants in contact with the catalyst may be used. For example, the diolefin and nitrile, if liquid, may be separately vaporized and passed over the catalyst, or the liquid reactants may be dropped on the catalyst previously heated to the temperature necessary to vaporize the reactants. Any desired type of apparatus may be used such as the catalyst-packed column described in the foregoing examples, which method allows an intimate contact between the reactants and the catalyst, or any other convenient apparatus. The process may be operated as a batch or continuous process. In the latter, the unreacted constituents are separated and recycled through the system.

The temperature at which the reactants are contacted with the catalyst will depend upon the combination of diolefin and nitrile being reacted, the catalyst used, rate of flow of the reactants over the catalyst, etc. It will be different for different combinations of reactants and must be so adjusted as to avoid the decomposition of the starting materials as well as the pyridine product. The temperature should be sufficiently high to maintain the reactants in the vapor phase. In general, temperatures of from about 300° C. to about 600° C. and preferably from about 400° C. to about 500° C. may be used.

The catalyst which is used to bring about the reaction between the diolefin and the nitrile may be any aluminum oxide catalyst, as, for example, alumina, promoted aluminum oxide catalysts, or any aluminum-based catalysts. Examples of these catalysts which have been found to be effective are alumina, nickel on alumina, chromium oxide on alumina, phosphoric acid promoted alumina, bauxite, aluminum chloride promoted bauxite, stannous chloride promoted alumina, etc. Any form of the catalyst may be used that is convenient as, for example, fine or coarse ground, pelleted, etc.

The reaction product is in general a mixture of the pyridine product and unreacted constituents. The pyridine or substituted-pyridine may easily be separated by fractional distillation. Thus, the process of this invention makes it possible to prepare any desired pyridine by a simple operation.

What I claim and desire to protect by Letters Patent is:

1. The process of preparing a pyridine which comprises reacting in the vapor phase and in the presence of an aluminum oxide catalyst, a conjugated diolefin hydrocarbon and an alkyl nitrile.

2. The process of preparing a pyridine which comprises reacting in the vapor phase and in the presence of an aluminum oxide catalyst, a conjugated butadiene hydrocarbon and an alkyl nitrile.

3. The process of preparing a pyridine which comprises reacting in the vapor phase and in the presence of a promoted aluminum oxide catalyst, a conjugated butadiene hydrocarbon and an alkyl nitrile.

4. The process of preparing 2-picoline which comprises reacting in the vapor phase butadiene with acetonitrile in the presence of an aluminum oxide catalyst.

5. The process of preparing 2-picoline which comprises reacting in the vapor phase butadiene with acetonitrile in the presence of a promoted aluminum oxide catalyst.

6. The process of preparing 2,4,5-trimethyl-pyridine which comprises reacting in the vapor phase dimethyl butadiene and acetonitrile in the presence of an aluminum oxide catalyst.

CYRUS A. WEISGERBER.

REFERENCES CITED

The following references are of record in the file of this patent:

UNITED STATES PATENTS

| Number | Name | Date |
|---|---|---|
| 2,447,600 | Schultze | Aug. 24, 1948 |
| 2,433,182 | Wolk | Dec. 13, 1944 |

OTHER REFERENCES

Chem. Abstracts, vol. 41, pp. 6797b and 6886b, 1947.